United States Patent
Long

(10) Patent No.: US 7,407,214 B2
(45) Date of Patent: Aug. 5, 2008

(54) SEAT ADJUSTING ASSEMBLY INCLUDING LEAD SCREW AND MOUNTING ATTACHMENT

(75) Inventor: Albert Yuguang Long, Ontario (CA)

(73) Assignee: Dura Global Technologies, Inc., Rochester Hills, MI (US)

(*) Notice: Subject to any disclaimer, the term of this patent is extended or adjusted under 35 U.S.C. 154(b) by 111 days.

(21) Appl. No.: 11/037,958

(22) Filed: Jan. 18, 2005

(65) Prior Publication Data

US 2006/0158002 A1 Jul. 20, 2006

(51) Int. Cl.
*B60N 2/04* (2006.01)

(52) U.S. Cl. .................. 296/65.13; 248/429

(58) Field of Classification Search .............. 296/65.15, 296/65.14, 65.13, 65.1; 248/430, 429
See application file for complete search history.

(56) References Cited

U.S. PATENT DOCUMENTS

| | | | | |
|---|---|---|---|---|
| 3,313,512 A | * | 4/1967 | Colautti et al. | ............... 248/424 |
| 4,802,374 A | | 2/1989 | Hamelin et al. | |
| 5,207,473 A | * | 5/1993 | Nawa et al. | ............... 296/65.15 |
| 5,707,035 A | * | 1/1998 | Kargol et al. | ............... 248/429 |
| 5,797,293 A | * | 8/1998 | Chaban | ............... 74/89.36 |
| 6,499,712 B1 | | 12/2002 | Clark et al. | |
| 6,688,667 B2 | * | 2/2004 | Nishimoto et al. | ....... 296/65.15 |
| 6,820,851 B2 | | 11/2004 | Mochizuki et al. | |
| 2003/0106978 A1 | | 6/2003 | Garrido | |
| 2004/0089784 A1 | | 5/2004 | Garrido | |

* cited by examiner

*Primary Examiner*—Dennis H Pedder
*Assistant Examiner*—Melissa Black
(74) *Attorney, Agent, or Firm*—Kevin S. MacKenzie; Gifford, Krass, Sprinkle, Groh; Dean B. Watson

(57) ABSTRACT

A seat adjusting assembly for a vehicle including a lower track member secured to the floor of the vehicle. An upper track member is slidingly coupled to the lower track member. The lower track member includes at least one slot formed therein. A lead screw having opposing first and second ends is disposed between the lower and upper track members. A support member is connected to the first and of the lead screw. The support member is additionally coupled to the lower track member. The support member includes at least one boss formed thereon. The at least one boss is received in the at least one slot of the lower track member for connecting a support member to the lower track member. The support member includes a neck portion deformable in response to bending of the lead screw for reducing breakage of the lead screw.

15 Claims, 3 Drawing Sheets

SEAT ADJUSTING ASSEMBLY INCLUDING LEAD SCREW AND MOUNTING ATTACHMENT

FIELD OF THE INVENTION

The invention relates to a vehicle seat having an adjusting assembly, and more particularly, to a seat adjusting assembly including a lead screw for adjusting a position of a seat.

BACKGROUND OF THE INVENTION

Seat adjusting devices, or assemblies for vehicle seats, are well known in the art. For example, seat adjusting assemblies include both manual and electric motor driven designs for moving a seat within an interior of a vehicle. An adjusting assembly utilizing an electric motor may be included as a standard feature in many new vehicles. Such designs typically utilize an electric motor coupled to an adjusting assembly to vary the position of a seat. Such designs may include an electric motor associated with a worm drive-type mechanism associated with a lead screw. The lead screw is mounted to either an upper or a lower track member to facilitate movement of a seat along the track mechanism.

The worm drive mechanism outlined above including a lead screw, often includes numerous parts requiring a complex assembly procedure when installing such mechanisms in a vehicle. There is therefore a need in the art for a simplified seat adjusting assembly reducing the total number of parts and allowing for easy and cost-effective installation of such an assembly in a vehicle.

Additionally, there is a need in the art for a seat adjusting assembly including a lead screw that is securely retained by a track member of a seat track assembly. The retaining of the lead screw should be of sufficient strength to meet crash test standards, as well as allow for easy assembly of a seat adjusting assembly. Further, there is a need for a seat adjusting assembly that accommodates flex and bending of the lead screw without shearing or breaking.

SUMMARY OF THE INVENTION

A seat adjusting assembly for a vehicle including a lower track member secured to the floor of the vehicle. An upper track member is slidingly coupled to the lower track member. The lower track member includes at least one slot formed therein. A lead screw having opposing first and second ends is disposed between the lower and upper track members. A support member is connected to the first end of the lead screw. The support member is additionally coupled to the lower track member. The support member includes at least one boss formed thereon. The at least one boss is received in the at least one slot of the lower track member for connecting a support member to the lower track member.

DETAILED DESCRIPTION OF THE PREFERRED EMBODIMENTS

Figure 1:
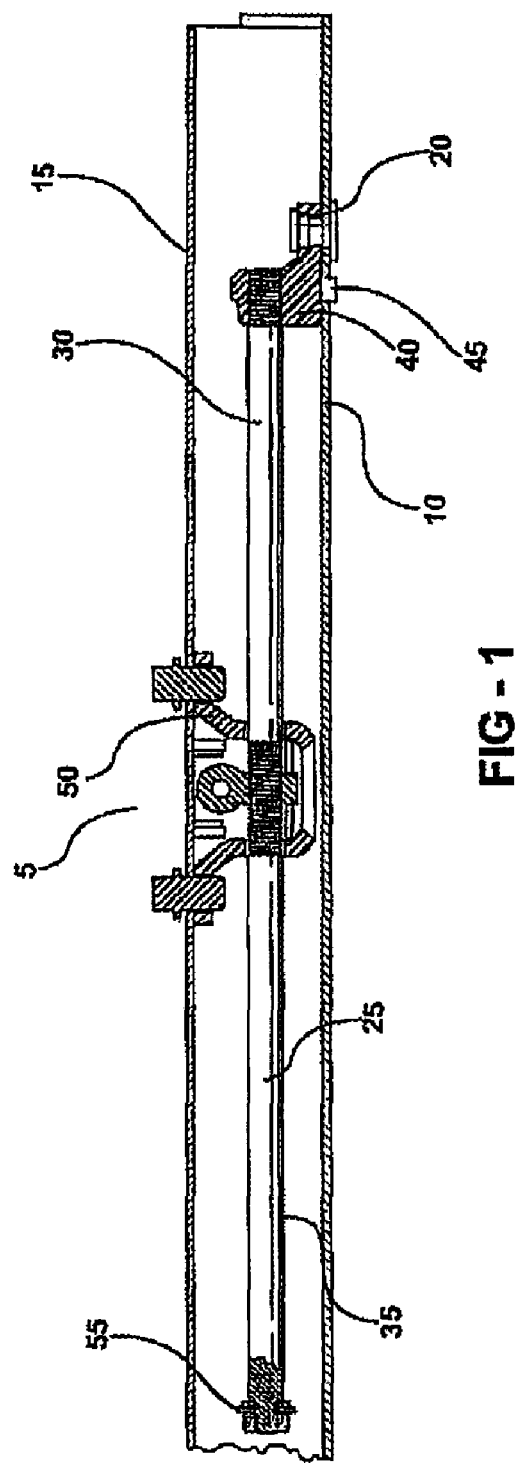
FIG. 1 is a side sectional view of a seat adjusting assembly including a lead screw and upper and lower track members.

Referring to FIG. 1, there is shown a seat adjusting assembly 5 according to a preferred embodiment of the present invention. The seat adjusting assembly 5 includes a lower track member 10 that is secured to the floor of a vehicle. An upper track member 15 is slidingly coupled to the lower track member 10 allowing for movement of a seat assembly along the track members. The lower track member 10 preferably includes at least one slot 20 formed therein. A lead screw 25 having opposing first and second ends 30, 35 is disposed between the upper and lower track members 10, 15. A support member 40 connected to the first end 30 of the lead screw 25 is coupled to the lower track member 10. The support member 40 may comprise a block, such as a block of metal. The support member 40 includes at least one boss 45 formed thereon that is received in the at least one slot 20 of the lower track member 10, thereby connecting the support member 40 to the lower track member 10.

As can be seen in FIG. 1, the lead screw 25 is supported at its first end 30 by the support member 40. The second end may be suspended above the lower track member 10. A drive assembly 50 is supportively linked to the lead screw 25 between the first and second ends 30, 35 of the lead screw 25. The drive assembly 50 moves along the lead screw 25 between the first end 30 connected to the support block 40, and the second end 35 which includes a stop washer 55 disposed thereon. Movement of the drive assembly 50 causes relative movement of the upper track member 15 relative to the lower track member 10, thereby adjusting the position of a seat associated with the seat adjusting assembly of the present invention.

Figure 2:
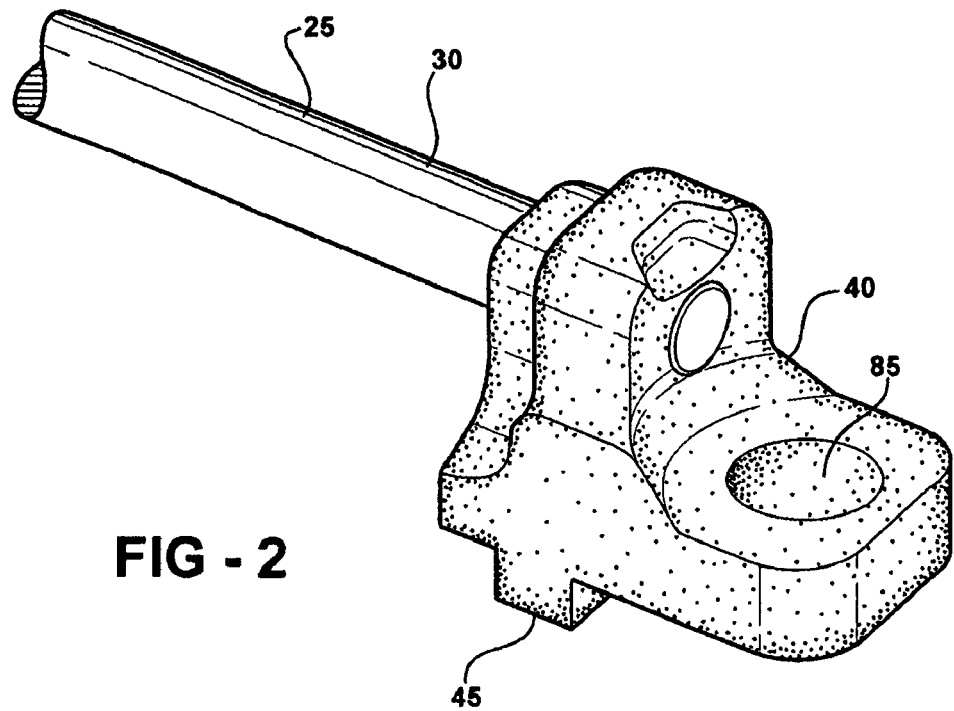
FIG. 2 is a perspective view of a portion of a lead screw coupled with a support member for engagement with the lower track member.
Figure 2A:
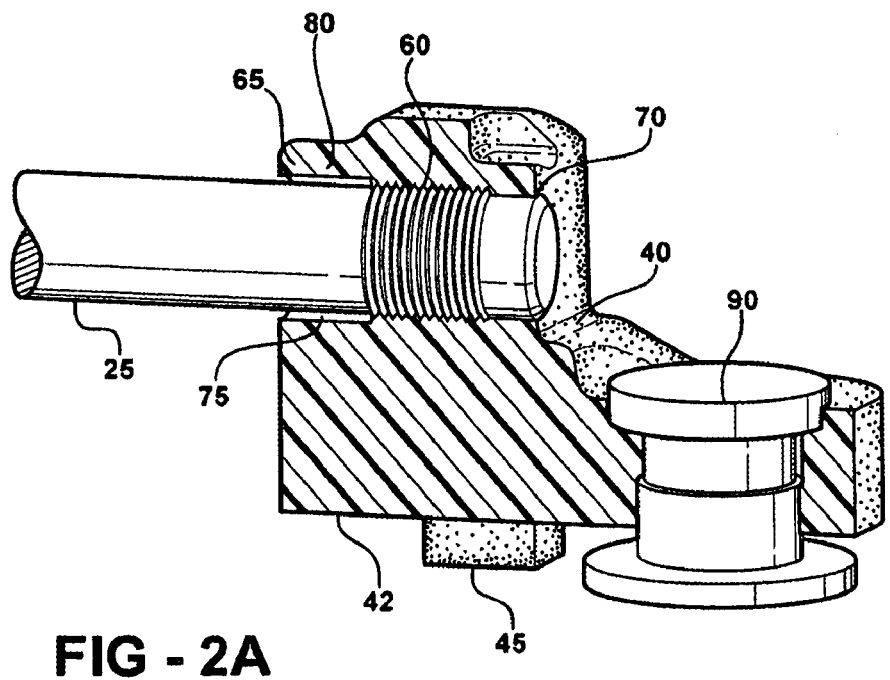
FIG. 2A is a side sectional view detailing the lead screw engaging the support member and showing a connecting element for connecting the support member to the lower track member.

Referring to FIGS. 2 and 2A, there is shown a support member 40 connected to the first end 30 of the lead screw 25. As best seen in FIG. 2A, the support member 40 includes a threading hole 60 formed therein along an axis of the lead screw 25 for connecting the lead screw 25 and support member 40. The threading hole 60 includes proximal and distal ends 65, 70. A counter bore 75 is formed in the threading hole 60 at the proximal end 65. The counter bore 75 defines a thin neck portion 80 of the support member 40 that is sized and/or composed of materials to reduce bending stress in the lead screw 25 at the threading hole 60. The counter bore 75 may be threadless and sized with an inner diameter that is greater that the outer diameter of the lead screw. The thin neck portion 80 is flexible or deformable in response to bending stresses applied by the lead screw 25. This feature of the thin neck portion 80 reduces lead screw 25 breakage when a large bending stress or force is applied to the lead screw 25 and when the support member 40 tilts.

Figure 3:
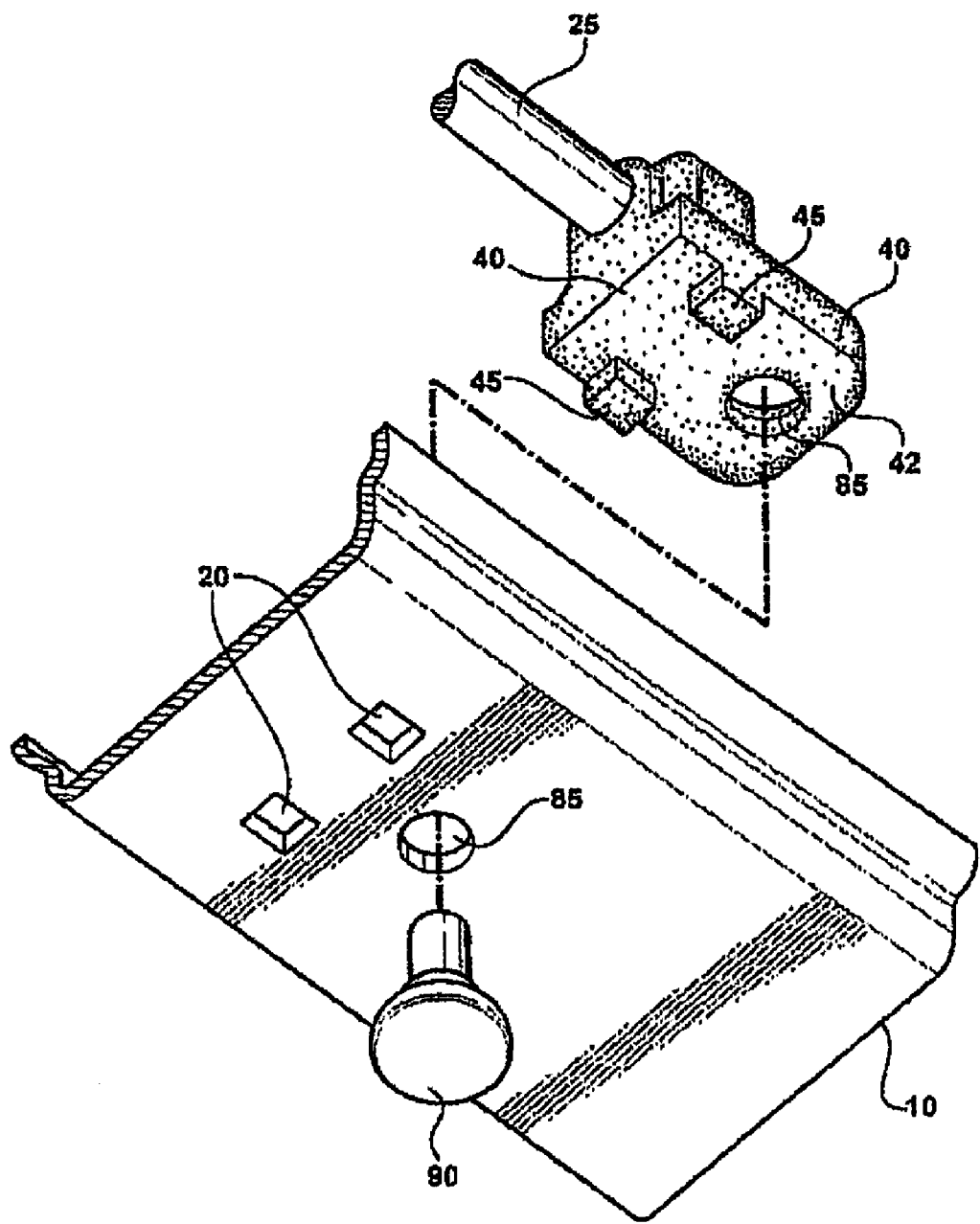
FIG. 3 is an assembly view detailing engagement of the lower track and support member.

Referring to FIG. 3, a portion of the lead screw 25 and support member 40 is shown for mating with the lower track member 10. As previously stated, the support member 40 includes at least one boss 45 formed thereon that is received in the at least one slot 20 of the lower track member 10 In a preferred aspect, and as shown in FIG. 3, two bosses 45 having a rectangular shape, are formed on a bottom surface 42 of the support member 40. As depicted in FIG. 3, the pair of bosses 45 are received in a pair of slots 20 formed in the lower track member 10. In a preferred aspect, the pair of slots 20 are sized such that the bosses 45 can be inserted and then locked into the slots 20 formed on the lower track member 10. Preferably, the slots 20 formed in the lower track member 10 are square-shaped to accommodate the square-shaped bosses 45 formed on the support member 40. However, alternative shapes, including circular and rectangular bosses and slots may be used by the present invention.

Again referring to FIG. 3, the lower track member 10, and support member 40, preferably include connecting holes 85, 85 formed therein for receiving a connecting element 90 linking the support member 40 and the lower track member 10. The connecting element 90 may comprise any suitable fastener, including screws, rivets and bolts. In the pictured preferred embodiment, a rivet is displayed as the connecting element 90 for insertion into the connecting holes 85, 85 formed in the lower track member 10 and support member 40.

When the support member 40 is connected to the lower track member 10, the pair of embossments 45 locks into the floor of the lower track member slots 20 so that a single connecting element 90 can be used to lock the support member 40 and lower track 10 together through the connecting holes 85, 85. This arrangement provides a very strong attachment between the support member and lower track member and is very simple to assemble. The number of components of the seat adjusting assembly of the present invention has a reduced number of components; thereby greatly reducing the cost of the system when compared with current prior art structures and is much easier to assemble.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A seat adjusting assembly for a vehicle comprising:
   a lower track member secured to the floor of the vehicle;
   an upper track member slidingly coupled to the lower track member, the lower track member including at least one slot formed therein;
   a stationary lead screw having opposing first and second ends, the lead screw disposed between the lower and upper track members;
   a support member connected to the first end of the lead screw, the support member coupled to the lower track member, the support member including at least one boss formed thereon, the at least one boss received in the at least one slot of the lower track member for connecting the support member to the lower track member.

2. The seat adjusting assembly of claim 1 wherein the at least one boss comprises a rectangular projection and locks into the at least one slot formed in the lower track member.

3. The seat adjusting assembly of claim 1 wherein the support member includes a pair of bosses formed thereon, the pair of bosses received in a pair of slots formed in the lower track member.

4. The seat adjusting assembly of claim 1 wherein the lower track member includes a connecting hole formed therein for receiving a connecting element linking the support member and the lower track member.

5. The seat adjusting assembly of claim 4 wherein the connecting element is selected from the group consisting of screws, rivets, and bolts.

6. The seat adjusting assembly of claim 4 wherein the support member includes a connecting hole formed therein for receiving the connecting element.

7. The seat adjusting assembly of claim 1 wherein the support member includes a threading hole formed therein along an axis of the lead screw for connecting the lead screw and support member, the threading hole including proximal and distal ends.

8. The seat adjusting assembly of claim 7 wherein the threading hole includes a counter bore formed at the proximal end.

9. The seat adjusting assembly of claim 8 wherein the counter bore defines a thin neck portion of the support member, the thin neck portion deformable in response to bending of the lead screw for preventing breakage of the lead screw.

10. The seat adjusting assembly of claim 1 wherein the second end of the lead screw includes a stop washer disposed thereon.

11. The seat adjusting assembly of claim 1 including a drive assembly coupled to the lead screw and attached to the upper track member.

12. A seat adjusting assembly for a vehicle comprising:
    a lower track member secured to the floor of the vehicle;
    an upper track member slidingly coupled to the lower track member, the lower track member including at least one slot formed therein;
    a stationary lead screw having opposing first and second ends, the lead screw disposed between the lower and upper track members;
    a support member connected to the first end of the lead screw, the support member coupled to the lower track member, the support member including a threading hole formed therein along an axis of the lead screw for connecting the lead screw and support member, the threading hole including proximal and distal ends.

13. The seat adjusting assembly of claim 12 wherein the threading hole includes a counter bore formed at the proximal end.

14. The seat adjusting assembly of claim 13 wherein the counter bore defines a thin neck portion of the support member, the thin neck portion deformable in response to bending of the lead screw for reducing breakage of the lead screw.

15. A seat adjusting assembly for a vehicle comprising:
    a lower track member secured to the floor of the vehicle;
    an upper track member slidingly coupled to the lower track member, the lower track member including at least one slot formed therein;
    a stationary lead screw having opposing first and second ends, the lead screw disposed between the lower and upper track members;
    a support member connected to the first end of the lead screw, the support member coupled to the lower track member, The support member including a threading hole formed therein along an axis of the lead screw for connecting the lead screw and support member, the threading hole including proximal and distal ends, the proximal end having a counter bore defining a neck portion of the support member, the neck portion deformable in response to bending of the lead screw for reducing breakage of the lead screw.

* * * * *